April 23, 1957     N. C. JESSEN     2,789,924
LOW ALLOY COATED ELECTRODES WITH LOW CARBON CORE
Filed June 8, 1954
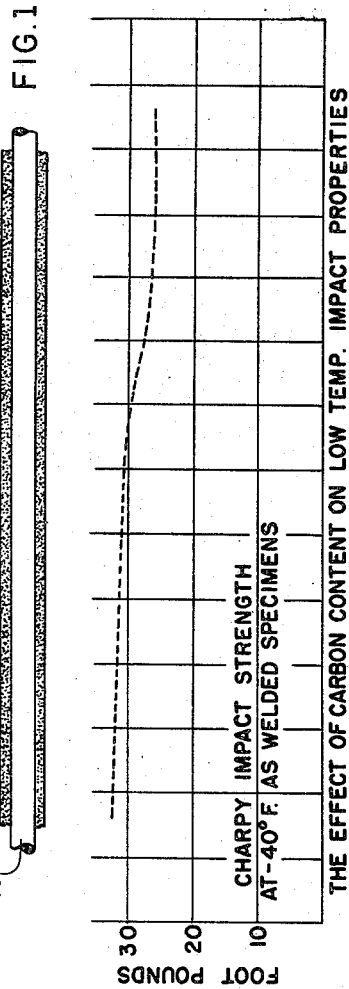
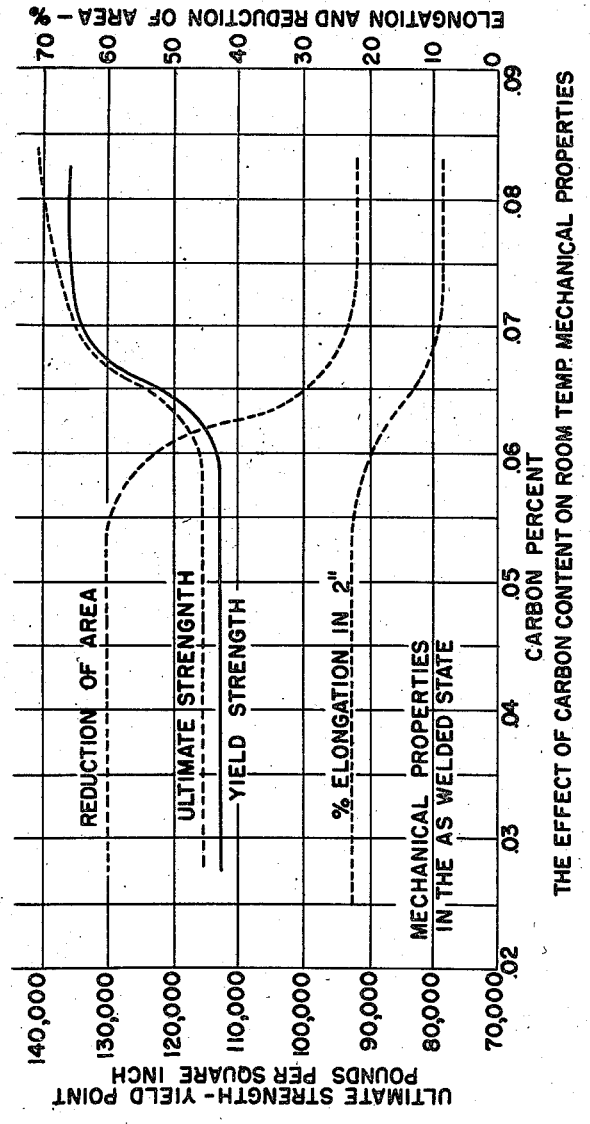
INVENTOR
Nicholas C. Jessen
BY
ATTORNEY United States Patent Office 2,789,924
Patented Apr. 23, 1957

2,789,924
LOW ALLOY COATED ELECTRODES WITH LOW CARBON CORE

Nicholas C. Jessen, Akron, Ohio, assignor to The Babcock & Wilcox Company, New York, N. Y., a corporation of New Jersey Application June 8, 1954, Serial No. 435,175

15 Claims. (Cl. 117—207)

This invention relates to welding electrodes for welding low alloy, ferritic, hardenable materials and, more particularly, to improved electrodes for such welding having a core of commercially pure iron with a substantially negligible carbon content, the core carrying a low hydrogen type coating having incorporated therewith alloying constituents for the weld deposit.

By the term "low alloy" steels as used herein is meant a steel having alloying constituents, such as chromium, molybdenum, manganese, and the like, in which the percentage of any constituent is less than about 10%. Typical compositions of this type are chromium steels containing chromium up to about 9% with or without molybdenum up to about 2%. Other typical steels of the "low alloy" type may contain manganese, silicon, nickel, molybdenum and vanadium in amounts of 2.5% or less.

Almost all low alloy steels containing chromium and carbon are, in their as-welded or quenched condition, hardened to an extent far greater than the normal carbon steels not containing any additional alloying agents. While the factor most responsible for this hardening is the carbon content, an appreciable carbon content is useful in obtaining desired strength characteristics. However, the properties obtainable with relatively high carbon contents may be substantially duplicated with very low carbon contents by using alloying ingredients other than carbon, such as manganese, chromium, molybdenum, etc., so that approximately equivalent characteristics of the weld deposit can be obtained, even though the carbon content is kept at a low enough level that the aforementioned hardening is reduced. The advantage of this substitution is that a weld deposit having high temperature properties approximately equivalent to those obtainable with a higher carbon content can be produced without the deposit being hardened to the extent that it would be if it had the higher carbon content.

More particularly, low alloy electrodes containing small percentages of chromium and molybdenum have been utilized, in which the electrode has an analysis corresponding closely to the desired analysis for the weld deposit with the exception that allowances have been made for slight losses of chromium during welding. The process of manufacturing these Cr-Mo electrodes involves the melting of the desired steel composition in a basic lined electric arc furnace, with the melt being silicon-killed during the process of manufacturing. Because of reluctance of steel makers to provide a rod of this type having a lower carbon content, the carbon limit has been set at 0.10% maximum.

Such a welding electrode has certain major defects or potential sources of trouble during welding or in the weld deposit. First, since a welding rod made from steel melted to the proper Cr-Mo analysis is of necessity a silicon-killed product, the disadvantages encountered with useability characteristics of a weldrod made from a killed steel heat are always present. In this connection, it is generally recognized in the welding art that a rimmed steel weldrod has better useability characteristics than a weldrod made from killed steel.

In the second place, although weldrods made by this process will occasionally have carbon contents as low as 0.05%, the average carbon content in such Cr-Mo weldrod obtained from the manufacturer will more nearly approach 0.07%–0.08%. Experimental work indicates that the ductility of a weld deposit made with a Cr-Mo weldrod of this type, in the as-welded state, varies directly with the alloy content and the carbon content. Up to and including an alloy content of 5% Cr-0.05% Mo, the as-welded ductility, which is the ductility of the weld metal in the as-deposited state without subsequent heat treatment, is of the order of 20% if the carbon content is less than 0.06%. When the carbon content of "points" is increased only slightly above 0.06%, the ductility drops sharply to about 10% and, as the carbon content approaches 0.10%, as-welded ductilities as low as 1.0% can be expected.

Such low ductilities in the as-welded state require very careful preheating of the workpieces, and preheating to unusually high temperatures, in order to avoid cracking of the weld deposit. Preheats of the order of 500–600 F. are common for this kind of welding. It will therefore be recognized that a greater as-welded ductility will permit a substantial lowering of the preheat time and temperature with resultant greater comfort to the welder during the work and thus better performance by the welder.

The third shortcoming involved in using a silicon-killed weldrod lies in the fact that welding core wire of "welding quality" is a rather difficult product to manufacture in that the term "welding quality" is vague and apparently has never been clearly defined in the art. For example, in the use of such silicon-killed wire, heats are encountered which have an unusually high inclusion content comprising principally entrapped silicates. Such heats are totally unsuitable for welding as the flux coating is not adequate to completely remove the inclusions in the course of welding, so that the resultant welds are exceedingly low in ductility and of insufficient quality to meet pressure vessel code requirements.

Another type of weldrod used for providing low alloy weld deposits comprises a carbon steel core wire coated with a low hydrogen coating of a lime, lime-titania, or titania-lime type. In this type of weldrod, the alloying ingredients are incorporated in the coating, either in the form of the metal itself or as chromium and molybdenum compounds, such as ferro-chromium and ferro-molybdenum, in such proportions as to produce the desired percentages of the alloying ingredients in the weld deposits. This type of electrode has much better useability characteristics than those which could be obtained with the aforementioned silicon-killed alloy core electrode. However, due to the high carbon content of the carbon steel core thereof, as-welded ductilities are extremely low so that high preheat temperatures and very carfully controlled heat treating and welding techniques are required in commercial practice.

The present invention avoids the aforementioned difficulties encountered with silicon-killed alloy core wire electrodes and the crack sensitivity characteristic of the use of low alloy electrodes with a carbon steel core wire by providing a novel weldrod in which the core has a carbon content not exceeding 0.05% maximum, and the core is coated with a low hydrogen type coating containing the alloying constituents.

More specifically, the core wire comprises commercially pure iron having a carbon content of less than 0.06%, a typical commercially pure iron being that known as "Armco iron" having a carbon content not exceeding 0.02%. The commercially pure iron core is provided with a low hydrogen type coating, such as a lime, lime-titania, or titania-lime coating comprising a coating compounded from minerals essentially free of chemically combined moisture. Typical minerals of this type are calcium fluoride, calcium carbonate, titanium dioxide, calcium silicate, magnesium carbonate, etc. The binder is selected from the group comprising, for example, sodium silicate and potassium silicate. Such coatings are characterized by the fact that they do not evolve deleterious amounts of gas during welding. Typical low hydrogen type coatings are described in U. S. Patent No. 2,588,700, issued March 11, 1952, and U. S. Patent No. 2,697,770, issued December 21, 1954, the patentee in each case being O. R. Carpenter.

The alloying ingredients are incorporated with the coating either in the form of pure ingredients or as compounds such as, for example, ferro-silicon or ferro-molybdenum. A particular advantage of the low carbon content is the fact that porosity-free welds can be more readily obtained with a low carbon electrode than with an electrode in which the carbon content is in excess of 0.06%. It is believed that porosity results partially from a reaction of carbon with the carbon dioxide and water vapor atmosphere surrounding the molten pool. Hence, with the carbon content of the molten metal kept at a very low level, and with a coating being used which produces little or no water vapor, the reaction is kept at a minimum so that the formation of gas bubbles in the molten metal is likewise at a minimum.

For an understanding of the invention principles, reference is made to the following description of typical embodiments thereof, and to the appended drawing.

In the drawing:

Fig. 1 is a sectional view through a coated weld rod embodying the invention; and Figs. 2 and 3 are charts indicating the relationship between the carbon content and physical properties of low alloy steel weld metal.

In carrying out the invention principles, a welding wire or core 10 is formed of commercially pure iron having a carbon content of less than 0.06%. A specific commercially pure iron which can be used effectively is that known as "Armco iron," which has a carbon content not exceeding 0.02%. The core 10 thus consists of iron and a very low percentage of carbon.

Core 10 is then coated in any known manner, for example by extrusion, with a low hydrogen type coating 15 compounded from minerals essentially free of chemically combined moisture, and a suitable binder. Typical low hydrogen type coatings are described in U. S. Patent No. 2,588,700, issued March 11, 1952, and U. S. Patent No. 2,697,770, issued December 21, 1954, the patentee in each case being O. R. Carpenter. Coating 15 may be a lime coating, lime-titania coating, or titania-lime coating, coatings of these types being well known to those skilled in the art. Typical minerals used in a low hydrogen coating are calcium fluoride, calcium carbonate, titanium dioxide, calcium silicate, magnesium carbonate, and similar materials. Preferred binders are sodium silicate or potassium silicate.

A lime type coating has a significantly high percentage of calcium carbonate, a lime-titania type coating contains also titanium dioxide, and a titania or titania-lime type coating contains a significantly high percentage of titanium dioxide.

In accordance with the invention, the alloying ingredients for the weld rod are all incorporated in the coating. The thus added alloying constituents may fall within the following range of composition:

| | Percent |
|---|---|
| Cr | 0.00–9.00 |
| Mo | 0.40–2.00 |
| Mn | 0.00–2.00 |
| Si | 0.00–2.00 |
| Ni | 0.00–3.00 |
| V | 0.00–0.50 |

A preferred range within this broader range is as follows:

| | Percent |
|---|---|
| Cr | 0.00–6.00 |
| Mo | 0.40–1.10 |
| Mn | 0.00–1.30 |
| Si | 0.00–1.00 |
| Ni | 0.00–2.5 |
| Va | 0.00–0.40 |

The alloying constituents may be added to the coating either in the pure form or as compounds. For example, the chromium may be chrome ore or ferro-chrome, the silicon may be added in the form of ferro-silicon, the molybenum in the form of ferro-molybdenum, and the manganese as ferro-manganese. The nickel may be nickel ore as may also be the vanadium.

Typical low alloy electrodes manufactured in accordance with the invention are those known to the art as "Croloy 1A," "Croloy 2A," "Croloy 2¼A," and "Croloy 5A." In making these "Croloy" electrodes or weld rods in accordance with the invention, alloy ingredients are added to a low hydrogen type coating, which is applied to a core of commercially pure iron having a carbon content not exceeding 0.05%. The alloy analyses for the coating are as follows:

*"Croloy 1A"*

| | Percent |
|---|---|
| Cr | 0.75–1.25 |
| Mo | 0.40–0.60 |

*"Croloy 2A"*

| | Percent |
|---|---|
| Cr | 1.75–2.25 |
| Mo | 0.40–0.60 |

*"Croloy 2¼A"*

| | Percent |
|---|---|
| Cr | 2.00–2.50 |
| Mo | 0.90–1.10 |

*"Croloy 5A"*

| | Percent |
|---|---|
| Cr | 4.00–6.00 |
| Mo | 0.40–0.60 |

The invention may also be utilized in manufacturing weld rods having a composition specifically designed for welding of high tensile steels for room or low temperature service where high impact strength is desired. In such case, the core is commercially pure iron having a carbon content not exceeding 0.05%. The alloying constituents are added to the low hydrogen coating applied to the core so as to give alloy analyses as in the two typical examples given below.

*Rod #1*

| | Percent |
|---|---|
| Mn | 0.50–1.00 |
| Si | 0.50–1.00 |
| Ni | 1.50–2.50 |
| Mo | 0.50–0.80 |
| V | 0.10–0.20 |

*Rod #2*

| | |
|---|---|
| Mn | 0.80–1.30 |
| Si | 0.50–1.00 |
| Ni | 1.50–2.50 |
| Mo | 0.70–1.10 |
| V | 0.20–0.40 |

The ductility of a low alloy weld deposit, formed with a Cr-Mo rod of the compositions listed above, in the as-welded state varies with the carbon content. The as-welded ductility, which is the ductility of the weld metal as deposited and without heat treatment, is of the order of 20% with a carbon content of less than 0.055%. When the carbon content is increased just slightly above 0.055%, the as-welded ductility drops sharply to about 10%. In Fig. 2, this is indicated by the sharp drop in the "Reduction of Area" and "Percent Elongation" curves at the 0.055% carbon point.

In Fig. 3, it will be noted that there is a pronounced drop in impact strength of weld deposits at −40° F. at the 0.055% carbon point, the weld deposits being in the as-welded condition without heat treatment.

The properties depicted in Figs. 2 and 3 permit a substantially lowering of preheat requirements when using the weld rods of the invention, as well as the obtaining of good ductilities or high impact strength at low temperatures without subsequent heat treatment.

While a specific embodiment of the invention has been shown and described in detail to illustrate the application of the invention principles, it will be understood that the invention may be embodied otherwise without departing from such principles.

What is claimed is:

1. In a welding rod of the type having a fusible metal core with a low hydrogen type mineral coating thereon, the coating having incorporated therein alloying ingredients including Mo and an element selected from the group consisting of Cr, Mn, Si, Ni, and V with the amount of any one alloying ingredient not exceeding 10%; the improvement comprising a core consisting essentially of substantially pure iron having a carbon content not exceeding 0.05%.

2. A welding rod as claimed in claim 1 in which the carbon content of the core does not exceed 0.03%.

3. A welding rod as claimed in claim 1 in which the alloying ingredients including, by weight, molybdenum from 0.40% to 2.00%.

4. A welding rod as claimed in claim 1 in which the alloying ingredients including by weight, chromium from 0.75% to 9.00%.

5. A welding rod as claimed in claim 1 in which the alloying ingredients including, by weight, molybdenum from 0.40% to 2.00%, and chromium from 0.75% to 9.00%.

6. A welding rod as claimed in claim 1 in which alloying ingredients including, by weight, molybdenum from 0.40% to 1.10%.

7. A welding rod as claimed in claim 1 in which the alloying ingredients including, by weight, chromium from 0.75% to 6%.

8. A welding rod as claimed in claim 1 in which the alloying ingredients including, by weight, molybdenum from 0.40% to 1.10%, and chromium from 0.75 to 6%.

9. A welding rod as claimed in claim 1 in which the alloying ingredients including, by weight, chromium from 0.75% to 6%, manganese from 0.50% to 1.30%, silicon from 0.50% to 1.00%, nickel from 1.50% to 2.50%, and vanadium from 0.10% to 0.40%.

10. A welding rod as claimed in claim 1 in which the alloying ingredients including, by weight, molybdenum from 0.50% to 0.80%, manganese from 0.50% to 1.00%, silicon from 0.50% to 1.00%, nickel from 1.50% to 2.50%, and vanadium from 0.10% to 0.20%.

11. A welding rod as claimed in claim 1 in which the alloying ingredients including, by weight, molybdenum from 0.70% to 1.10%, manganese from 0.80% to 1.30%, silicon from 0.50% to 1.00%, nickel from 1.50% to 2.50%, and vanadium from 0.20% to 0.40%.

12. A welding rod as claimed in claim 1 in which the alloying ingredients including, by weight, chromium from 0.75% to 1.25%, and molybdenum from 0.40% to 0.60%.

13. A welding rod as claimed in claim 1 in which the alloying ingredients including, by weight, chromium from 1.75% to 2.25%, and molybdenum from 0.40% to 0.60%.

14. A welding rod as claimed in claim 1 in which the alloying ingredients including, by weight, chromium from 2.00% to 2.50%, and molybdenum from 0.90% to 1.10%.

15. A welding rod as claimed in claim 1 in which the alloying ingredients including, by weight chromium from 4.00% to 6.00%, and molybdenum from 0.40% to 0.60%.

References Cited in the file of this patent
UNITED STATES PATENTS

| Number | Name | Date |
|---|---|---|
| 1,544,422 | Becket | June 30, 1925 |
| 1,559,015 | Stoody | Oct. 27, 1925 |
| 1,599,056 | Lloyd et al. | Sept. 7, 1926 |
| 2,011,706 | Blumberg | Aug. 20, 1935 |
| 2,140,237 | Leitner | Dec. 13, 1938 |
| 2,408,619 | Friedlander | Oct. 1, 1946 |
| 2,408,620 | Friedlander | Oct. 1, 1946 |
| 2,432,773 | Lee | Dec. 16, 1947 |
| 2,564,474 | Feild | Aug. 14, 1951 |